United States Patent
Breslau et al.

(10) Patent No.: US 6,499,041 B1
(45) Date of Patent: Dec. 24, 2002

(54) METHODS, SYSTEMS AND COMPUTER PROGRAM PRODUCTS FOR COPYING BETWEEN TEMPLATES HAVING ASSOCIATED FIELD DESIGNATIONS

(75) Inventors: Franklin Charles Breslau, Teaneck, NJ (US); Paul Gregory Greenstein, Croton-on-Hudson, NY (US); John Ted Rodell, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/222,690

(22) Filed: Dec. 29, 1998

(51) Int. Cl.⁷ .............................................. G06F 17/21
(52) U.S. Cl. ........................................ 707/505; 707/507
(58) Field of Search ........................ 707/513, 507–509, 707/1, 6, 10, 101, 102, 104.1, 203, 530

(56) References Cited

U.S. PATENT DOCUMENTS

| | | | |
|---|---|---|---|
| 5,765,005 A | * 6/1998 | Maruoka et al. | 707/505 |
| 5,793,887 A | 8/1998 | Zlotnick | 382/209 |
| 5,794,259 A | * 8/1998 | Kikinis | 345/810 |
| 5,802,514 A | * 9/1998 | Huber | 345/769 |
| 5,805,158 A | * 9/1998 | Bertram et al. | 345/169 |
| 5,845,300 A | * 12/1998 | Comer et al. | 707/508 |
| 5,963,925 A | * 10/1999 | Kolling et al. | 705/27 |
| 5,999,939 A | * 12/1999 | de Hilster et al. | 705/28 |
| 6,002,867 A | * 12/1999 | Jazdzewski | 707/507 |
| 6,084,585 A | * 7/2000 | Kraft et al. | 345/733 |
| 6,112,215 A | * 8/2000 | Kaply | 345/810 |
| 6,119,136 A | * 9/2000 | Takata et al. | 707/501.1 |
| 6,192,380 B1 | * 2/2001 | Light et al. | 707/10 |
| 6,199,079 B1 | * 3/2001 | Gupta et al. | 705/26 |
| 6,239,802 B1 | * 5/2001 | Lahey et al. | 345/810 |
| 6,247,029 B1 | * 6/2001 | Kelley et al. | 707/505 |
| 6,327,598 B1 | * 12/2001 | Kelley et al. | 707/501.1 |

OTHER PUBLICATIONS

Method for Copying Differently Formatted Records with a Field Processor, *IBM Technical Disclosure*, vol. 30, No. 12, May, 1998.

* cited by examiner

Primary Examiner—Joseph H. Feild
(74) Attorney, Agent, or Firm—Myers Bigel Sibley & Sajovec; Edward H. Duffield

(57) ABSTRACT

Methods, systems and computer program products for copying data between templates having data stored in fields. The field designations of the source and target template are read and compared and data is copied between fields having matching field designations. For example, each field in the target template with the same field name and field size as a field in the source template receives the data from the corresponding field of the first template. Non-matching fields are presented to a user to obtain instructions on how to complete the copying operation. The user may specify concatenation, splitting, or renaming/resizing to provide source data for the target template. Alternatively, the non-matching fields in the target template may be left empty or the user may manually enter data by using a clipboard function or keying in new data.

26 Claims, 4 Drawing Sheets

| From Template A | To Template B |
|---|---|
| Name | Name |
| Address | Address |
| City, State | City<br>State |
| Telephone Number | Telephone Number |
| | Fax Number |

FIG. 4

METHODS, SYSTEMS AND COMPUTER PROGRAM PRODUCTS FOR COPYING BETWEEN TEMPLATES HAVING ASSOCIATED FIELD DESIGNATIONS

FIELD OF THE INVENTION

The present invention relates generally to computer systems, methods, and program products, and more particularly to computer systems, methods, and program products for copying data.

BACKGROUND OF THE INVENTION

Data is frequently maintained on computers in a template format where data is placed in fields within the template. The fields typically have an associated field designation such as a field name and may further include a specification of field size and type. Field type may include text, currency or other data type. An example of a template containing fields is an address directory database including a plurality of records each representing address information for a different customer, client or other contact for an individual or company. The various fields within an address book template may include name, address, city, state, zip code or other field information.

If data is stored on a computer in a template format within fields, a problem may arise when it is necessary to copy data from one template to another. The field designations of a source template may not identically match those of a target template. For example, a user may wish to copy address book information from one application program database to another which uses a slightly modified data field format. Typically, database programs provided with an ability to import records to populate the fields of the database with data assume an import file format based on ordering of the data rather than field designations associated with individual pieces of data in the import file. For example, comma delimited import files may be provided where commas are placed to mark demarcations between fields within a record and CR/LF (carriage return/line feed) characters mark the end of individual records. Import operations copying the import file into the template format of the receiving database then proceed sequentially with field transition and record transition decisions being made based upon the CR/LF and comma characters as they are encountered during the read operation. Similarly, clipboard type copy and paste operations typically provided by various computer operating systems presently in use typically will copy and paste data contained in a template but will do so without maintaining information related to the field designations associated with the various data segments.

These approaches to copying of data to field based templates each have various limitations which create difficulties for a user in copying data from a first template to a second template. Both of these conventional approaches may require user formatting or intervention to provide the logical association between data blocks in the source template and the target location in the destination template. Therefore, it would be desirable to provide improved methods, systems and computer program products for copying between templates.

SUMMARY OF THE INVENTION

Accordingly, it is an object of the present invention to provide methods, system:; and computer program products for copying data between templates using field designation information.

It is a further object of the present invention to provide such methods, systems and computer program products that provide for copying of data from matching and non-matching fields.

These and other objects are provided, according to the present invention, by methods, systems and computer program products for copying data between templates having data stored in fields. The field designations of the source and target template are read and compared and data is copied between fields having matching field designations. For example, each field in the target template with the same field name and field size as a field in the source template receives the data from the corresponding field of the first template. Non-matching fields are present d to a user to obtain instructions on how to complete the copying operation. The user may specify concatenation, splitting, or renaming/resizing to provide source data for the target template. Alternatively, the non-matching fields in the target template may be left empty or the user may manually enter data by using a clipboard function or keying in new data.

In one embodiment of the present invention, a method for copying data between templates contained on a computer is provided including receiving a designation of a first template containing data associated with a plurality of fields and of, second template to which the data is to be copied. A first plurality of field designations associated with the fields of the first template and a second plurality of field designations associated with a plurality of fields of the second template are read. Data associated with ones of the plurality of fields of the first template is then co pied to corresponding ones of the plurality of fields of the second template having field designations matching field designations associated with the fields of the first template.

In another embodiment of the present invention, the designation of the first template may be a designation of a portion of the first template containing the data to be copied, the portion including a plurality of the plurality of fields of the first template. In one embodiment the field designations have an associated name and size ant copying is provided by comparing the field designations of the first template to the field designations of the second template to identify ones of the field designations of the first template having associated names and sizes which are identical to ones of the field designations of the second template to determine identical fields. Data associated with identical fields from the first template is copied o the second template.

In a further embodiment of the present invention ones of the first plurality of field designations and ones of the second plurality of field designations having non-matching field designations are displayed to a user. Designations of data to be copied into designated ones of the plurality of fields of the second template are received from the user and the designated data is copied into the designated ones of the plurality of fields of the second template. The user designation may be provided as a user selection of a field designation from the second template to be associated with a field designation selected by the user from the first template for copying data. Alternatively, data may be received from the user for placement in a field of the second template selected by the user.

In another embodiment of the present invention, one of the matching field designations is displayed to a user and a designation of whether copying of a field associated with the displayed field designation is desired is received from the user. Data associated with the field associated with the displayed field designation is copied if the user designations copying as desired. These operations are repeated for each of the matching field designations.

In a further embodiment of the present invention, one of the non-matching field designations is displayed to a user and a designation of a type of copying to be use for the displayed field designation is received from the user. Data is copied into a field of the second template responsive to the received designation of a type of copying to be used. The type of copying may be selected from the group consisting of manual copying, renaming, concatenating and splitting. For manual copying data received from the user is placed in a field of the second template selected by the user. For renaming, at least one of renaming or resizing a field of at least one of the first template or the second template selected by the user to provide a new matching field designation is performed and then data is copied into a field of the second template having a field designation corresponding to the new matching field designation from a field of the first template having a field designation corresponding to the new matching field designation. For concatenating, a plurality of fields of at least one of the first template or the second template selected by the user are concatenated and data is copied from the concatenated plurality of fields to one of the fields of the other of the first template or the second template selected by the user. For splitting, data from a field of at least one of the first template or the second template selected by the user is split into at least two portions and a first one of the portions is copied into a first one of the fields of the other of the first template or the second template selected by the user and a second one of the portions is copied into a second one of the fields of the other of the first template or the second template selected by the user.

In one embodiment of the present invention, copy operations are performed using a clipboard function. In another embodiment, data is copied using memory mapping.

While the invention has been described above primarily with respect to the method aspects of the invention, both systems and computer program products are also provided.

Accordingly, the present invention provides for intelligent copying of data between templates based upon the information contained in the field designations of the source and target templates.

BRIEF DESCRIPTION OF THE DRAWINGS

FIG. 4 is a diagram illustrating a field display according to an embodiment of the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods, systems or computer program products. Accordingly, the present invention may take the form of a hardware embodiment, a software embodiment or an embodiment combining software and hardware aspects.

Figure 1:
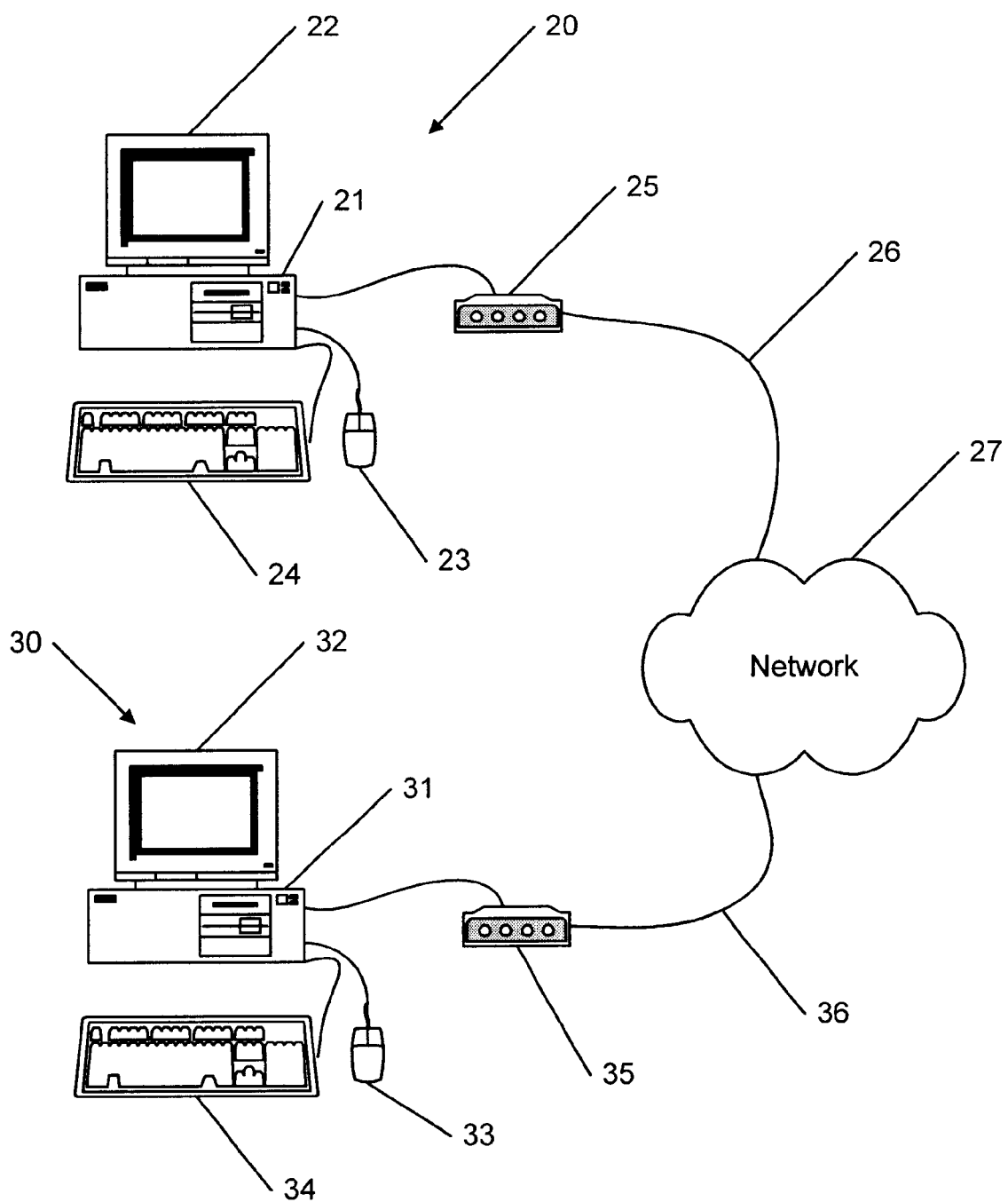
FIG. 1 is a schematic diagram of an operating environment implementing operations according to an embodiment of the present invention.

Referring now to FIG. 1, copy operations according to the present invention may be provided for users accessing a network having shared resources or operating in a standalone mode. In either case, a user may execute an operating environment suitable for supporting copy operations according to the present invention running on a computer 20. Computer 20 in a network embodiment may include , but is not limited to, Apple®, IBM®, or IBM-compatible personal computers or other data processing systems known to those of skill in the art. Computer 20 preferably includes a central processing unit 21, a display 22, a pointing device 23, a keyboard 24, a communications device 25 (such as a modem or network interface), and a connection 26 for connecting to a network 27. The keyboard 24, having a plurality of keys thereon, is in communication with the central processing unit 21. A pointing device 23, such as a mouse, is also connected to the central processing unit 21. The network connection 26 may be made via traditional phone lines, an ISDN link, a T1 link, a T3 link, via cable television, via a network adapter card (NIC) such as an ethernet adapter or a Token Ring™ (IBM) adapter or the like.

The central processing unit 21 contains one or more microprocessors (not shown or other computational devices and random access memory (not shown) or its functional equivalent, including but not limited to, RAM, FLASHRAM, and VRAM for storing programs therein for processing by the microprocessor(s) or other computational devices. Computer 20, if an IBM®, or IBM-compatible personal computer, preferably utilizes either a Windows® 3.1, Windows 95®, Windows 98®, Windows NT®, Unix®, or OS/2® operating system.

Furthermore, it is to be understood that a device not having computational capability, or having limited computational capability, may be utilized in accordance with the present invention for copying data through a network where the execution of the program instructions of the operating environment are execute d remote from the workstation of the user. Thus, the present invention may also be utilized in "mainframe" systems where a plurality of terminals, typically dumb terminals, share a processing system. Such system are well known to those of skill in the art and, therefore, will not be described in detail herein.

In a networking environment, the present invention may be utilized in client/server or other such network environments, including intranet, extranet, and Internet environments utilizing Transport Control Protocol/Internet Protocol (TCP/IP) communications, Asynchronous Transfer Mode (ATM) or other such interconnection and communication protocols which allow communication between computers such as between a computer 20 and computer 30.

Computer 30 may have a configuration similar to that of a computer 20 and may include a central processing unit 31, a display 32, a pointing device 33, a keyboard 34, a communications device 35, and a network connection 36 for connecting to the network 27. However, computer 30 may be configured in the same manner or in a different manner than computer 20. Accordingly, the present invention may be utilized in a homogeneous or a heterogenous network. For example, computer 30 may be implemented using other processors and via other computing devices, including, but not limited to, mainframe computing systems and minicomputers.

Operations of the present invention will now be described with respect to the flowcharts of FIGS. 2 and 3. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 2:
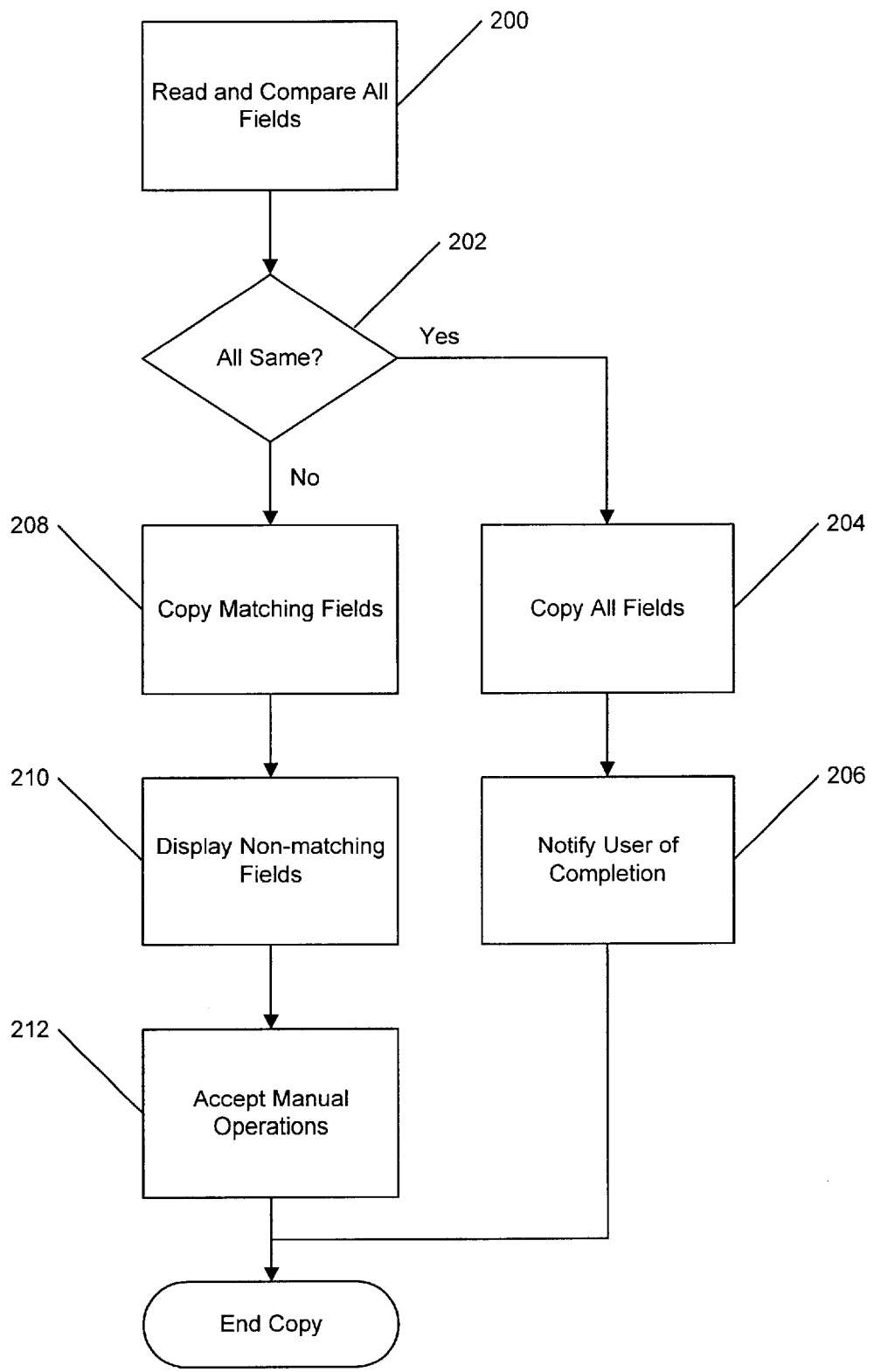
FIG. 2 is a flowchart illustrating operations for copying according to an embodiment of the present invention.

Referring now to FIG. 2, operations for template copying according to a first embodiment of the present invention will now be described. It is to be understood that the term "template copying" as used herein is intended to encompass cut and paste as well as copying operations. The embodiment illustrated in FIG. 2, as contrasted with that which will be described with reference to FIG. 3, uses minimal user prompting during the template copying operation.

As used herein, the term "template" refers to field associated data records on a computer. For example, a data table may be provided with rows and columns and associated names and each cell of the table may have an associated cell size or width. Similarly, records from a database such as an address book may include various field names such as street address, city, phone number and so on. Each field name may have associated with it one or more entries for each record in the database. Various other data storage structures wherein portions of the stored data are associated with field names and/or field widths and which contain a plurality of records are known to those of skill in the art and are understood to fall within the usage of the term template in descriptions of template copying operations provided herein and as claimed in the present invention. For ease of understanding, descriptions as provided further herein will be directed to an exemplary template based on an address book database for purposes of illustration and are not intended to limit the scope of the invention as more generally claimed herein.

Operations begin at block 200 where the template field designations of the source and target templates are read responsive to a copy request from a user. The request to initiate template copying operations at block 200 may be received from a user by various known interfaces. For example, a command format specifying the template, copying command followed by the "from" file designation and the "to" file designation can be entered such as is known under the DOS interface format. Various options can be provided specifying which embodiment of the copy opera tions of the present invention will be implemented. An exemplary command line along this format is shown below:

TC<from><to>(options:prompt,check)

where TC initiates template copy operations according to the present invention, <from> designates a source template, <to> designates a target template, and the options specify various optional levels of user interaction during the copy operations. Alternatively, windows display buttons, such as those known for use with a mouse 23, 33, light pen or other user input device, may be utilized to initiate copy operations and specify a source file and a target file including, alternatively, a designation of a portion of a file as a source file.

The field designations of the source and the target template are then compared to each other. The field designations may be field names or, alternatively, may encompass both a field name and a specified field width (size). Accordingly, matching operations as subsequently described may be limited to matching the field name or both field name and field width between source and target templates for copying.

Operations at block 200 including reading the field designations of both the source and target template specified. In one embodiment, in addition to checking the field names for the comparison of the field designations, field widths are further compared. At block 202, if all of the field designations exactly match when comparing both the source and the target field designations, operations move to block 204 and all fields are copied from the designated source template to the target template. Alternatively, a user could be provided an opportunity to respond to a yes/no query before initiating copy operations at block 204. The requesting user is notified of completion of copy operations following copy of the data between all of the fields (block 206). Copy operations at block 204 provide for copying data associated with ones of the plurality of fields of the first (or source) designated template to corresponding ones of the plurality of fields of the second (or target) template having field designations matching field designations associated with the fields of the first template.

Template copying operations at block 204 and as otherwise described herein May be done via addressing between two fields in the same address space or by using a clipboard function such as those commonly provided with various operating systems where the data is temporarily copied into a commonly accessible area are then copied into the destination area. In the case of the present template copying operations, the clipboard maybe used recursively to copy data from one template field and then paste the data into another template field. Various PC operating systems such as OS/2, Windows 3.1, Windows 95, Windows 98 and Windows NT each have clipboard functions suitable for use in implementing the copy operations of the present invention.

Alternatively, memory mapping may be used to support copy operations of each field at block 204. In this embodiment, a set of memory locations are identified that contain the data in the field of the source template. These same memory locations are defined with pointers for the target (or destination) template so that both templates point to the same data locations in memory. Accordingly, a data store operation to provide copying may be implemented by taking these values and storing them in permanent persistent storage.

If all fields do not match at block 202, matching fields are copied (block 208). After the matching fields are copied, non-matching fields are displayed to the user (block 210). Preferably, for field mismatches, all fields from both the from (source) and to (target) template that do not compare are listed along with an indication to the user that the listed fields do not compare. The user may then manually enter information or copy information selectively. The list presented to the user may be displayed, for example, on a monitor 22, 32. Furthermore, fields with potential correspondence may be aligned and presented in a source template and target template column in row format. For example, field designations having the same field name but a different field width may be presented in the same row. Similarly, fields with partial field name matches can be presented in adjacent rows. An exemplary display list is illustrated in FIG. 4.

Note that fields may be ordered differently and may also, as with the illustrated example of FIG. 4, include an identification of the matching field designations along with the mismatched designations. For example, in the illustrated example of FIG. 4, the name, address and telephone number fields are matching fields which are displayed to the user and shown in shared row format. The user then provides input, such as through mouse 23, 33 or keyboard 24, 34, to design ate data for entry into two fields or selection of fields from the source template to move data from into designated fields of the two template (block 212).

Figure 3:
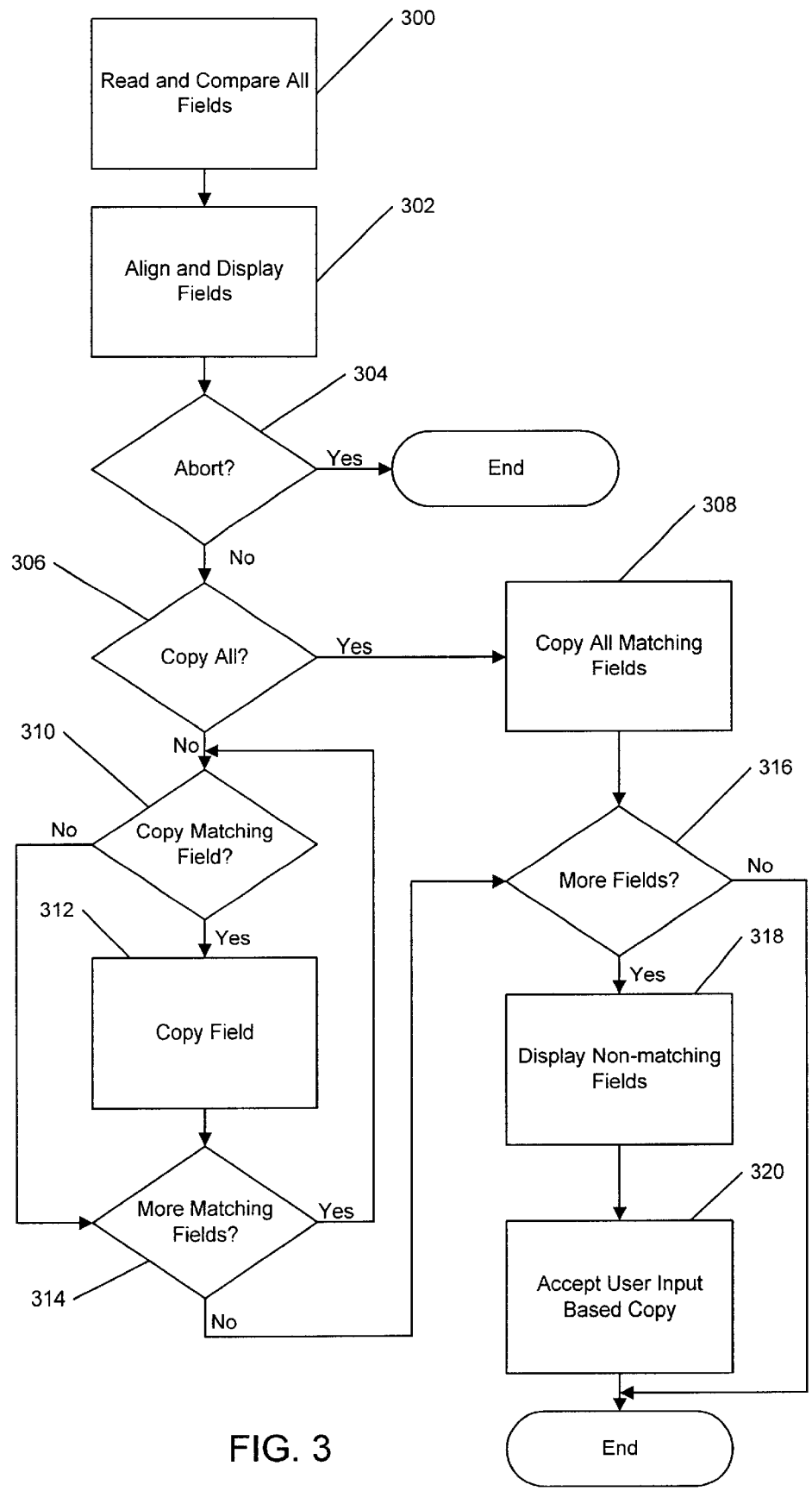
FIG. 3 is a flowchart illustrating operations for copying according to another embodiment of the present invention.

Referring now to FIG. 3, an alternative embodiment of the copy operations according to the present invention involving prompting will now be described. At block 300, field designations from the source and target templates are read and compared as described previously in connection with block 200 of FIG. 2. All of the fields are then aligned and displayed (block 302). The display, as with the example of FIG. 4, may provide for alignment of every matching name/width field in common rows. A unique naming convention is preferably assumed wherein identical matches in field name and, optionally, field width may be required before treating fields as matching. At this point, the user is given the choice of aborting template copy operations based upon the information contained in the displayed aligned fields (block 304), in which case operations are ended. Furthermore, the user may elect to copy all fields (block 306) in which case all matching fields are copied as described previously with reference to block 208 of FIG. 2 (block 308).

If the copy all matching fields option is not elected by a user (block 306) then copy one at a time operations commence by providing a first matching field selection to the user for selection (block 310). If the user requests copying of the identified matching field, the data from the field is copied from the source to the destination template field (block 312). Otherwise, operations bypass copying for that field and move to block 314. If there are more matching fields (block 314) operations return to block 310 and repeat until each matching field has been displayed to the user for a determination of whether a data copy is desired by the user for that field.

Once all matching fields are copied (block 308) or no more matching fields remain to be presented to the user for copy selection (block 314) operations move to block 316 to determine if there are any non-matching fields in either the source template or the target template. If additional fields exist (block 316) the user is presented with the remaining non-matching fields in a list format, preferably in two column format, on display 22, 32 (block 318). User input is then accepted and copy operations are carried out responsive to the user input (block 320).

The user may be presented with a variety of different options to control copying of the remaining field data at block 320. Possible approaches include manual copying, renaming/resizing, concatenating, splitting or aborting copy operations. Manual copying allows users to manually select and copy data, for example, using the operating system clipboard function to copy and paste the selected portions of data in the appropriate locations. Alternatively, keyboard entry of data may be directly provided into destination fields using keyboard 24, 34. Renaming operations allow a user to rename or to resize field designations in either the "from" or "to" column of the display to create an additional matching field designation for copying. For example, a field name "street address" in the "from" field and a corresponding field bearing the different name "address" in the "to" field could be converted into a matching field designation by changing the field name in either the source or target template.

The third option, concatenating, may be used in either the "from" or "to" columns (i.e., with reference to either the source or target template) to allow field matching to be established. For example, if the source template has city and state as a single field and the target template has them as two separate fields, as shown in the example display of FIG. 4, the user may concatenate the two separate fields and adjust the width to create a new matching field with the name "city, state." Splitting is, essentially, the opposite of concatenating. In other words, a "city, state" field in the source template may be split or separated into two separate fields and the widths adjusted if necessary. A user may select different options for different non-matching fields in the source and target template to obtain the desired intelligent template copying results in copying according to the teachings of the present invention.

While operations have been described above with reference to copying from a single source template to a single target template, the teachings of the present invention are to be understood to apply to multiple copies. For example, a single source template (or multiple source templates) could be specified for copying into a plurality of target templates.

In a further aspect of the copying operations according to the present invention, a modified template copy for use in copying information from a template is provided. In this aspect of the invention, the target destination for copying of the data need not be a field associated template destination. Accordingly, field information associated with the source data is provided by copying field designation information into a clipboard along with the data contained in the field when a portion of a template containing data in fields is designated for copying. For example, a portion may be designated by a user using known rubber banding techniques with a mouse 23, 33. The highlighted (or selected portions are then copied into the clipboard function of the operating system in use on computer 20, 30 including the field designations along with the contained data. When the copied portion is subsequently pasted into a destination location both the field designation and data information is pasted and available for access by a user. Accordingly, field contained data from a template is not copied in a large block devoid of any description as is presently provided with existing clipboard type functions.

As will be appreciated by those of skill in this art, the above-described aspects of the present invention in FIGS. 2 and 3 may be provided by hardware, software, or a combination of the above. Various components of the application management system of the present invention may, in practice, be implemented by a microcontroller including input and output ports and running software code, by custom or hybrid integrated circuits, by discrete components or by a combination of the above. Similarly, various of the operations may be implemented as software programs executing on a workstation. More generally, as described above, operations according to the present invention may be realized in the hardware of existing computers which, when so configured, provide for copy operations according to the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for copying data between templates contained on a computer comprising the steps of:
    receiving a designation of a first template containing data associated with a plurality of fields;
    receiving a designation of a second template to which the data is to be copied;
    reading a first plurality of field designations associated with the fields of the first template;
    reading a second plurality of field designations associated with a plurality of fields of the second template; and
    copying data associated with ones of the plurality of fields of the first template to corresponding ones of the plurality of fields of the second template having field designations matching field designations associated with the fields of the first template.

2. A method according to claim 1 wherein the step of receiving a designation of the first template comprises the step of receiving a designation of a portion of the first template containing the data to be copied, the portion including a plurality of the plurality of fields of the first template.

3. A method according to claim 1 wherein the field designations have an associated name and size and wherein the step of copying data comprises the steps of:
    comparing the field designations of the first template to the field designations of the second template to identify ones of the field designations of the first template having associated names and sizes which are identical to ones of the field designations of the second template to determine identical fields; and
    copying data associated with identical fields from the first template to the second template.

4. A method according to claim 1 further comprising the steps of:
    displaying ones of the first plurality of field designations and ones of the second plurality of field designations having non-matching field designations;
    receiving designations of data to be copied into designated ones of the plurality of fields of the second template; and
    copying the designated data into the designated ones of the plurality of fields of the second template.

5. A method according to claim 4 wherein the step of receiving designations comprises the step of receiving from a user a designation of a field of the second template to copy data to from a field of the first template designated by the user.

6. A method according to claim 5 wherein the step of receiving from a user a designation comprises the step of receiving from a user a selection of a field designation from the second template to be associated with a field designation selected by the user from the first template for copying data.

7. A method according to claim 4 wherein the step of receiving designations comprises the step of receiving data from a user for placement in a field of the second template selected by the user.

8. A method according to claim 1 wherein the step of copying data comprises the steps of:
    displaying one of the matching field designations to a user;
    receiving from the user a designation of whether copying of a field associated with the displayed field designation is desired;
    copying data associated with the field associated with the displayed field designation if the user designations copying as desired; and
    repeating the displaying, receiving from the user and copying data associated with the field steps for each of the matching. field designations.

9. A method according to claim 1 wherein the reading steps re followed by the steps of:
    comparing the field designations of the first template to the field designations of the second template to identify non-matching field designations;
    displaying at least one of the non-matching field designations to a user;
    receiving from the user a designation of a type of copying to be used for the displaced field designation; and
    copying data into a field of the second template responsive to the received designation of a type of copying to be used.

10. A method according to claim 9 wherein the type of copying is selected from the group consisting of manual copying, renaming, concatenating and splitting.

11. A method according to claim 9 wherein the type of copying is manual copying and the step of copying data into a field comprises the step of placing data received from the user in a field of the second template selected by the user.

12. A method according to claim 9 wherein the type of copying is renaming and the step of copying data into a field comprises the step of at least one of renaming or resizing a field of at least one of the first template or the second template selected by the user to provide a new matching field designation and then copying data into a field of the second template having a field designation corresponding to the new matching field designation from a field of the first template having a field designation corresponding to the new matching field designation.

13. A method according to claim 9 wherein the type of copying is concatenating and the step of copying data into a field comprises the step of concatenating a plurality of fields of at least one of the first template or the second template selected by the user and copying data from the concatenated plurality of fields to one of the fields of the other of the first template or the second template selected by the user.

14. A method according to claim 9 wherein the type of copying is splitting and the step of copying data into a field comprises the step of splitting data from a field of at least one of the first template or the second template selected by the user into at least two portions and copying a first one of the portions into a first one of the fields of the other of the first template or the second template selected by the user and copying a second one of the portions into a second one of the fields of the other of the first template or the second template selected by the user.

15. A method according to claim 1 wherein the step of copying data comprises the step of copying data using a clipboard function.

16. A method according to claim 1 wherein the step of copying data comprises the step of copying data using memory mapping.

17. A template copying system comprising:

means for receiving a designation of a first template containing data associated with a plurality of fields;

means for receiving a designation of a second template to which the data is to be copied;

means for reading a first plurality of field designations associated with the fields of the first template;

means for reading a second plurality of field designations associated with a plurality of fields of the second template; and means for copying data associated with ones of the plurality of fields of the first template to corresponding ones of the plurality of fields of the second template having field designations matching field designations associated with the fields of the first template.

18. A system according to claim 17 further comprising:

means for displaying ones of the first plurality of field designations and ones of the second plurality of field designations having non-matching field designations;

means for receiving designations of data to be copied into designated ones of the plurality of fields of the second template; and means for copying the designated data into the designated ones of the plurality of fields of the second template.

19. A system according to claim 17 wherein the means for copying data comprises:

means for displaying one of the matching field designations to a user;

means for receiving from the user a designation of whether copying of a field associated with the displayed field designation is desired; and means for copying data associated with the field associated with the displayed field designation if the user designations copying as desired.

20. A system according to claim 17 further comprising:

means for comparing the field designations of the first template to the field designations of the second template to identify non-matching field designations;

means for displaying at least one of the non-matching field designations to a user;

means for receiving from the user a designation of a type of copying to be used for the displayed field designation; and means for copying data into a field of the second template responsive to the received designation of a type of copying to be used.

21. A system according to claim 20 wherein the type of copying is selected from the group consisting of manual copying, renaming, concatenating and splitting.

22. A computer program product for copying data between templates, the computer program product comprising:

a computer-readable storage medium having computer-readable program code leans embodied in said medium, said computer-readable program code means comprising:

computer readable program code means for receiving a designation of a first template containing data associated with a plurality of fields;

computer readable program code means for receiving a designation of a second template to which the data is to be copied;

computer readable program code means for reading a first plurality of field designations associated with the fields of the first template;

computer readable program code means for reading a second plurality of field designations associated with a plurality of fields of the second template; and computer readable program code means for copying data associated with ones of the plurality of fields of the first template to corresponding ones of the plurality of fields of the second template having field designations matching field designations associated with the fields of the first template.

23. A computer program product according to claim 22 further comprising:

computer readable program code means for displaying ones of the first plurality of field designations and ones of the second plurality of field designations having non-matching field designations;

computer readable program code means for receiving designations of data to be copied into designated ones of the plurality of fields of the second template; and computer readable program code means for copying the designated data into he designated ones of the plurality of fields of the second template.

24. A computer program product according to claim 23 wherein the computer readable program code means for copying data comprises:

computer readable program code means for displaying one of the matching field designations to a user;

computer readable program code means for receiving from the user a designation of whether copying of a field associated with the displayed field designation is desired; and computer readable program code means for copying data associated with the field associated with the displayed field designation if the user designations copying as desired.

25. A computer program product according to claim 23 further comprising:

computer readable program code means for comparing the field designations of the first template to the field designations of the second template to identify non-matching field designations;

computer readable program code means for displaying at least one of the non-matching field designations to a user;

computer readable program code means for receiving from the user a designation of a type of copying to be used for the displayed field designation; and computer readable program code means for copying data into a field of the second template responsive to the received designation of a type of copying to be used.

26. A computer program product according to claim 25 wherein the type of copying is selected from the group consisting of manual copying, renaming, concatenating and splitting.

* * * * *

UNITED STATES PATENT AND TRADEMARK OFFICE
CERTIFICATE OF CORRECTION

| | | |
|---|---|---|
| PATENT NO. | : 6,499,041 B1 | |
| APPLICATION NO. | : 09/222690 | |
| DATED | : December 24, 2004 | |
| INVENTOR(S) | : Franklin Charles Breslau, Paul Gregory Greenstein and John Ted Rodell | |

It is certified that error appears in the above-identified patent and that said Letters Patent is hereby corrected as shown below:

Please delete claim 9, beginning at column 10, lines 16 through 27, and replace with the following claim 9:

9. A method according to claim 1 wherein the reading steps [re] are followed by the steps of:
comparing the field designations of the first template to the field designations of the second template to identify non-matching field designations;
displaying at least one of the non-matching field designations to a user;
receiving from the user a designation of a type of copying to be used for the displaced field designation; and
copying data into a field of the second template responsive to the received designation of a type of copying to be used.

UNITED STATES PATENT AND TRADEMARK OFFICE
CERTIFICATE OF CORRECTION

| | | |
|---|---|---|
| PATENT NO. | : 6,499,041 B1 | |
| APPLICATION NO. | : 09/222690 | |
| DATED | : December 24, 2004 | |
| INVENTOR(S) | : Franklin Charles Breslau, Paul Gregory Greenstein and John Ted Rodell | |

It is certified that error appears in the above-identified patent and that said Letters Patent is hereby corrected as shown below:

Please delete claim 22, beginning at column 11, line 53 through column 12, line 15, and replace with the following claim 22:

22. A computer program product for copying data between templates, the computer program product comprising:
a computer-readable storage medium having computer-readable program code [leans] means embodied in said medium, said computer-readable program code means comprising:
computer-readable program code means for receiving a designation of a first template containing data associated with a plurality of fields;
computer readable program code means for receiving a designation of a second template to which the data is toe be copied;
computer readable program code means for reading a first plurality of field designations associated with the fields of the first template;
computer readable program code means for reading a second plurality of field designations associated with a plurality of fields of the second template;
and computer readable program code means for copying data associated with ones of the plurality of fields of the first template to corresponding ones of the plurality of fields of the second template having field designations matching field designations associated with the fields of the first template.

Signed and Sealed this

Seventeenth Day of October, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,499,041 B1 | Page 1 of 2 |
| APPLICATION NO. | : 09/222690 | |
| DATED | : December 24, 2002 | |
| INVENTOR(S) | : Franklin Charles Breslau, Paul Gregory Greenstein and John Ted Rodell | |

It is certified that error appears in the above-identified patent and that said Letters Patent is hereby corrected as shown below:

Please delete claim 9, beginning at column 10, lines 16 through 27, and replace with the following claim 9:

9. A method according to claim 1 wherein the reading steps [re] are followed by the steps of:
   comparing the field designations of the first template to the field designations of the second template to identify non-matching field designations;
   displaying at least one of the non-matching field designations to a user;
   receiving from the user a designation of a type of copying to be used for the displaced field designation; and
   copying data into a field of the second template responsive to the received designation of a type of copying to be used.

UNITED STATES PATENT AND TRADEMARK OFFICE
CERTIFICATE OF CORRECTION

| | | |
|---|---|---|
| PATENT NO. | : 6,499,041 B1 | |
| APPLICATION NO. | : 09/222690 | |
| DATED | : December 24, 2002 | |
| INVENTOR(S) | : Franklin Charles Breslau, Paul Gregory Greenstein and John Ted Rodell | |

It is certified that error appears in the above-identified patent and that said Letters Patent is hereby corrected as shown below:

Please delete claim 22, beginning at column 11, line 53 through column 12, line 15, and replace with the following claim 22:

22. A computer program product for copying data between templates, the computer program product comprising:
a computer-readable storage medium having computer-readable program code [leans] means embodied in said medium, said computer-readable program code means comprising:
computer-readable program code means for receiving a designation of a first template containing data associated with a plurality of fields;
computer readable program code means for receiving a designation of a second template to which the data is toe be copied;
computer readable program code means for reading a first plurality of field designations associated with the fields of the first template;
computer readable program code means for reading a second plurality of field designations associated with a plurality of fields of the second template;
and computer readable program code means for copying data associated with ones of the plurality of fields of the first template to corresponding ones of the plurality of fields of the second template having field designations matching field designations associated with the fields of the first template.

This certificate supersedes Certificate of Correction issued October 17, 2006.

Signed and Sealed this

Twenty-eighth Day of November, 2006

JON W. DUDAS
*Director of the United States Patent and Trademark Office*